United States Patent
Lee et al.

(10) Patent No.: US 12,229,936 B2
(45) Date of Patent: Feb. 18, 2025

(54) SUPER RESOLUTION SEM IMAGE IMPLEMENTING DEVICE AND METHOD THEREOF

(71) Applicant: Samsung Electronics Co., Ltd., Suwon-si (KR)

(72) Inventors: Ho Joon Lee, Goyang-si (KR); Il Kwon Kim, Hwaseong-si (KR); Sang Gul Park, Hwaseong-si (KR); Chang Wook Jeong, Hwaseong-si (KR); Moon Hyun Cha, Yongin-si (KR); Sat Byul Kim, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 356 days.

(21) Appl. No.: 17/721,616

(22) Filed: Apr. 15, 2022

(65) Prior Publication Data
US 2023/0043089 A1 Feb. 9, 2023

(30) Foreign Application Priority Data

Aug. 4, 2021 (KR) .................. 10-2021-0102440
Oct. 5, 2021 (KR) .................. 10-2021-0131782

(51) Int. Cl.
*G06T 7/00* (2017.01)
*G06T 1/00* (2006.01)
(Continued)

(52) U.S. Cl.
CPC .......... *G06T 7/0004* (2013.01); *G06T 1/0007* (2013.01); *G06T 3/4053* (2013.01);
(Continued)

(58) Field of Classification Search
CPC ... G06T 7/0004; G06T 1/0007; G06T 3/4053; G06T 5/20; G06T 5/70; G06T 11/00;
(Continued)

(56) References Cited

U.S. PATENT DOCUMENTS

| 7,626,163 | B2 | 12/2009 | Honda |
| 10,395,356 | B2 * | 8/2019 | Zhang .................. G06V 10/454 |

(Continued)

FOREIGN PATENT DOCUMENTS

| EP | 3 686 841 A1 | 7/2020 |
| KR | 10-2253227 | 5/2021 |

OTHER PUBLICATIONS

Zhang, Hao, et al. "High-throughput, high-resolution deep learning microscopy based on registration-free generative adversarial network." Biomedical optics express 10.3 (2019): 1044-1063. (Year: 2019).*

(Continued)

*Primary Examiner* — Oneal R Mistry
*Assistant Examiner* — Jongbong Nah
(74) *Attorney, Agent, or Firm* — Harness, Dickey & Pierce, P.L.C.

(57) ABSTRACT

Some example embodiments relate to a super resolution scanning electron microscope (SEM) image implementing device and/or a method thereof. Provided a super resolution scanning electron microscope (SEM) image implementing device comprising a processor configured to crop a low resolution SEM image to generate a first cropped image and a second cropped image, to upscale the first cropped image and the second cropped image to generate a first upscaled image and a second upscaled image, and to cancel noise from the first upscaled image and the second upscaled image to generate a first noise canceled image and a second noise canceled image.

20 Claims, 19 Drawing Sheets

(51) Int. Cl.
*G06T 3/40* (2024.01)
*G06T 3/4053* (2024.01)
*G06T 5/00* (2024.01)
*G06T 5/20* (2006.01)
*G06T 5/70* (2024.01)
*G06T 11/00* (2006.01)

(52) U.S. Cl.
CPC .................. *G06T 5/20* (2013.01); *G06T 5/70* (2024.01); *G06T 11/00* (2013.01); *G06T 2207/10061* (2013.01); *G06T 2207/30148* (2013.01)

(58) Field of Classification Search
CPC . G06T 2207/10061; G06T 2207/30148; G06T 2207/20081; G06T 2207/20084; G06T 2207/30141; G06T 2207/30168
See application file for complete search history.

(56) References Cited

U.S. PATENT DOCUMENTS

| | | | |
|---|---|---|---|
| 10,467,729 B1 | 11/2019 | Perera et al. | |
| 10,648,924 B2 | 5/2020 | Zhang et al. | |
| 10,949,949 B2 | 3/2021 | Leem et al. | |
| 11,715,197 B2* | 8/2023 | Song | G06F 18/22 382/100 |
| 2006/0291042 A1 | 12/2006 | Alfano et al. | |
| 2019/0333199 A1* | 10/2019 | Ozcan | G06T 5/70 |
| 2021/0027984 A1* | 1/2021 | Chou | H01J 37/153 |
| 2021/0342991 A1* | 11/2021 | Jacob | G06T 7/30 |

OTHER PUBLICATIONS

Wang, Ziyuan, et al. "An image denoising method based on deep residual GAN." Journal of Physics: Conference Series. vol. 1550. No. 3. IOP Publishing, 2020 (Year: 2020).*
European Office Action dated Nov. 7, 2022 issued in European Patent Application No. 22 170 445.5-1210.
European Search Report dated Nov. 2, 2022 issued in European Patent Application No. 22170445.5-1210.
Zhang Hao et al: "High-throughput, high-resolution deep learning microscopy based on registration-free generative adversarial network", Biomedical Optics Express, vol. 10, No. 3, XP0559302, pp. 1-20 (2019).
Ilesanmi Ademola E. et al: "Methods for image denoising using convolutional neural network: a review", Complex & Intelligent Systems, Jun. 10, 2021 (Jun. 10, 2021), XP055845282, ISSN: 2199-4536, DOI: 10.1007/s40747-021-00428-4 Retrieved from the Internet: URL:https://link.springer.com/content/pdf/ 10.1007/s40747-021-00428-4.pdf>.
European Office Action dated Mar. 6, 2024 issued in European Patent Application No. 22 170 445.5-1210.
Yan Fu, et al. "Application of GAN in optimizing compressed sensed MR imaging of brachxial plexus," Proc. Intl. Soc. Mag. Med. 28 (2020).

* cited by examiner

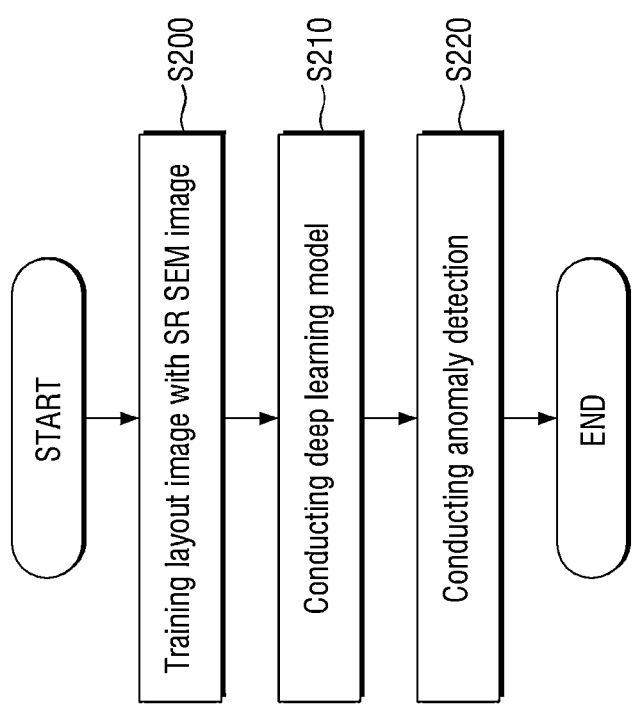

SUPER RESOLUTION SEM IMAGE IMPLEMENTING DEVICE AND METHOD THEREOF

CROSS-REFERENCE TO RELATED APPLICATION

This application claims priority from Korean Patent Application No. 10-2021-0102440 filed on Aug. 4, 2021 and No. 10-2021-0131782 filed on Oct. 5, 2021 in the Korean Intellectual Property Office, and all the benefits accruing therefrom under 35 U.S.C. 119, the contents of which in its entirety are herein incorporated by reference.

BACKGROUND

Some example embodiments relate to a super resolution scanning electron microscope (SEM) image implementing device and/or a method, e.g. a n operating method, thereof.

As the development degree of difficulty of a semiconductor device increases, the importance of evaluation of a process of the semiconductor device has increased. In the evaluation of the process of the semiconductor device, the evaluation of the process of the semiconductor device may be performed based on an image obtained through a scanning electron microscope (SEM) apparatus.

In this case, when an SEM image obtained through the SEM apparatus is obtained as a super resolution image, and the evaluation of the process of the semiconductor device is performed based on the super resolution image, a long turn-around-time (TAT) may occur. However, when the evaluation of the process of the semiconductor device is performed through a low resolution SEM image, accuracy of the evaluation may be decreased.

SUMMARY

By implementing a super resolution SEM image using deep learning based on a low resolution SEM image obtained through the SEM apparatus, a TAT may be decreased and the accuracy of the evaluation of the process of the semiconductor device may be increased.

Aspects of example embodiments a super resolution scanning electron microscope (SEM) image implementing device that implements a super resolution SEM image with improved reliability from a low resolution SEM image.

Alternatively or additionally, some example embodiments provide a super resolution SEM image implementing method that implements a super resolution SEM image with improved reliability from a low resolution SEM image.

Alternatively or additionally, some example embodiments provide a super resolution SEM image implementing system that implements a super resolution SEM image with improved reliability from a low resolution SEM image.

According to some example embodiments, there is provided a super resolution scanning electron microscope (SEM) image implementing device comprising a processor configured execute machine-readable instructions to cause the device to crop a low resolution SEM image to generate a first cropped image and a second cropped image, to upscale the first cropped image and the second cropped image to generate a first upscaled image and a second upscaled image, and to cancel noise from the first upscaled image and the second upscaled image to generate a first noise canceled image and a second noise canceled image.

According to some example embodiments, there is provided a super resolution SEM image implementing method comprising, generating a first cropped image and a second cropped image by cropping a low resolution SEM image by processor, generating a first upscaled image and a second upscaled image by upscaling the first cropped image and the second cropped image by the processor, and generating a first noise canceled image and a second noise canceled image by canceling noise from the first upscaled image and the second upscaled image by the processor.

According to some example embodiments, there is provided a super resolution SEM image implementing system comprising, a central processing unit 200, a bus connected to the central processing unit, and a super resolution SEM image implementing device communicating with the central processing unit via the bus, The super resolution SEM image implementing device includes, a processor configured to crop a low resolution SEM image to generate a first cropped image and a second cropped image, to upscale the first cropped image and the second cropped image to generate a first upscaled image and a second upscaled image, and to cancel noise from the first upscaled image and the second upscaled image to generate a first noise canceled image and a second noise canceled image.

BRIEF DESCRIPTION OF THE DRAWINGS

The above and other aspects and features of the present disclosure will become more apparent by describing in detail some example embodiments thereof with reference to the attached drawings, in which:

FIG. 19 is an illustrative flowchart for describing an operation of the anomaly detection unit according to some example embodiments.

DETAILED DESCRIPTION OF VARIOUS EXAMPLE EMBODIMENTS

Figure 1:
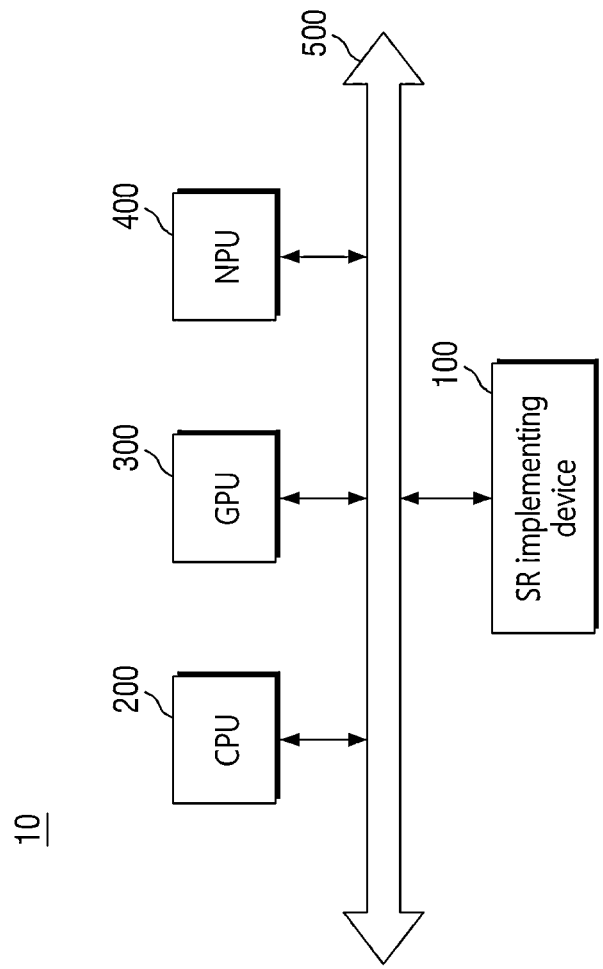
FIG. 1 is an illustrative block diagram illustrating a super resolution scanning electron microscope (SEM) image implementing system according to some example embodiments.

FIG. 1 is an illustrative block diagram illustrating a super resolution scanning electron microscope (SEM) image implementing system according to some example embodiments.

Referring to FIG. 1, a super resolution SEM image implementing system 10 according to some example embodiments includes a central processing unit (CPU) 200 and a graphics processing unit (GPU) 300, a neural processing unit (NPU) 400, and a super resolution SEM image implementing device 100.

The central processing unit 200 may control an overall operation of the super resolution SEM image implementing system 10; for example, operations of other components constituting the super resolution SEM image implementing system 10.

The super resolution SEM image implementing system 10 may include an accelerator, which is a dedicated circuit for a high-speed data operation such as an artificial intelligence (AI) data operation. The accelerator may include, for example, the graphics processing unit 300, the neural network processing unit 400, and/or a data processing unit (DPU) (not illustrated).

The super resolution SEM image implementing system 10 includes the super resolution SEM image implementing device 100 that implements a low resolution SEM image as a super resolution SEM image.

When an SEM image obtained through an SEM apparatus is obtained as a super resolution image and evaluation of and/or an adjustment of a process of a semiconductor device is performed based on the super resolution image, a long turn-around time (TAT) may occur. Alternatively, when the evaluation of and/or an adjustment of the process of the semiconductor device is performed using a low resolution SEM image in order to decrease a TAT, accuracy of the evaluation may be decreased. The SEM image may be obtained during the process of semiconductor fabrication, e.g. as part of a critical-dimension (CD) measurement and/or adjustment process.

Accordingly, by implementing a super resolution SEM image using deep learning based on a low resolution SEM image obtained through the SEM apparatus by the super resolution SEM image implementing device 100, the TAT may be decreased, and additionally the accuracy of the evaluation of the process of the semiconductor device may be increased.

Hereinafter, an operation and a method of implementing a super resolution SEM image using deep learning based on a low resolution SEM image obtained through the SEM apparatus by the super resolution SEM image implementing device 100 will be described.

Figure 2:
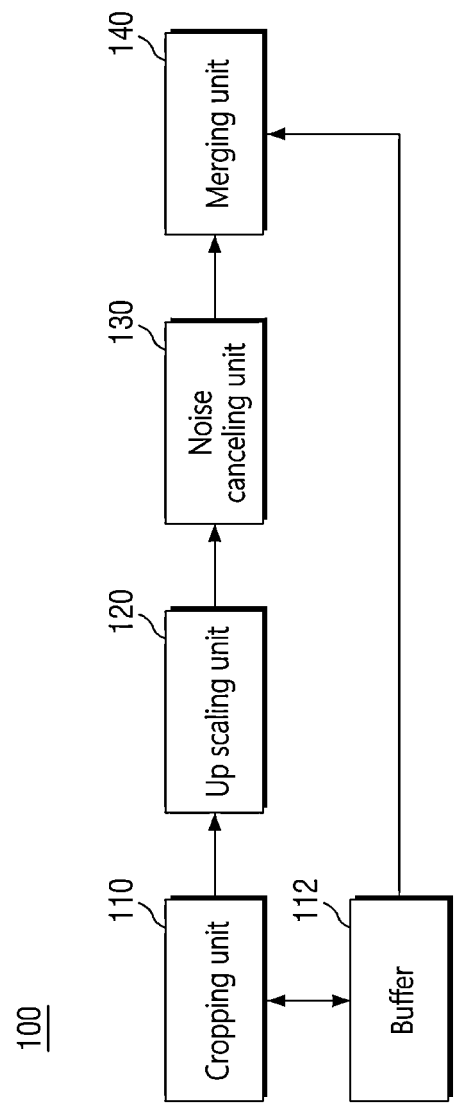
FIG. 2 is an illustrative block diagram illustrating a super resolution SEM image implementing device according to some example embodiments.

FIG. 2 is an illustrative block diagram illustrating a super resolution SEM image implementing device according to some example embodiments.

The super resolution SEM image implementing device 100 includes a cropping unit 110, a buffer 112, an upscaling unit 120, a noise canceling unit 130, and a merging unit 140. Each of the components described in FIG. 2 are illustrated as different elements; however, example embodiments are not limited thereto. Some of the functions described with reference to one or more elements in FIG. 2 may be performed by one or more other elements described in FIG. 2. The functions of the elements illustrated in FIG. 2 may be performed by a processor, e.g. a processor configured to execute machine-readable instructions that, when executed, cause the processor to perform various functions.

The cropping unit 110 may perform cropping on the low resolution SEM image. An operation of the cropping unit 110 will be described with reference to FIG. 3.

Figure 3:
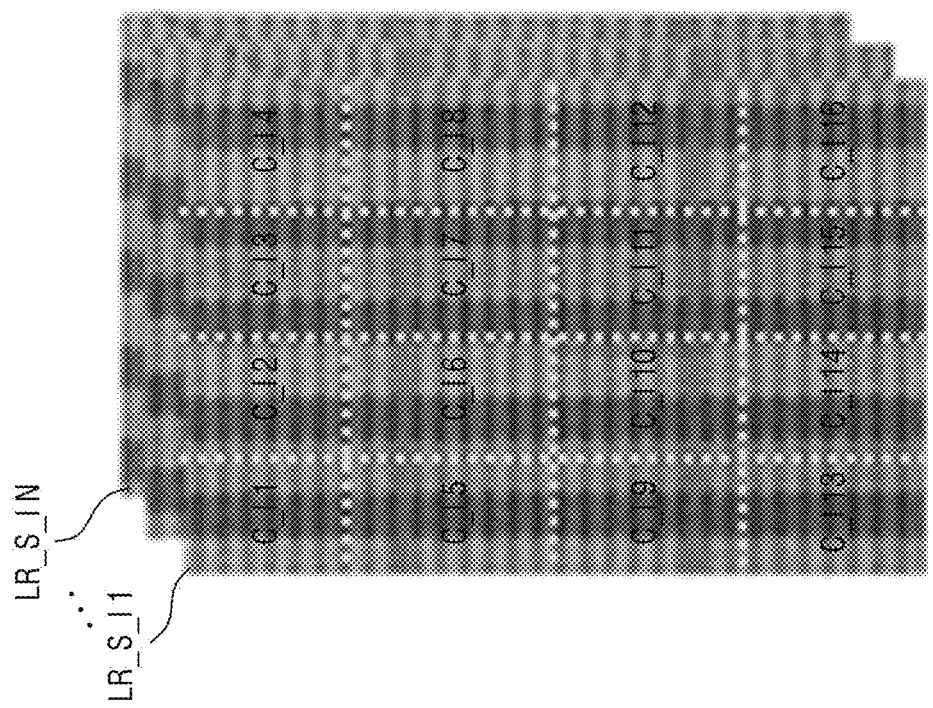
FIG. 3 is an illustrative view for describing a cropping operation of a cropping unit.

FIG. 3 is an illustrative view for describing a cropping operation of a cropping unit.

Referring to FIGS. 2 and 3, the cropping unit 110 receives a first low resolution SEM image LR_S_I 1 to an N-th low resolution SEM image LR_S_I N obtained through an SEM apparatus, where N is a natural number greater than 1. Hereinafter, an operation and an implementing method of the super resolution SEM image implementing device according to some example embodiments will be described with respect to the first low resolution SEM image LR_S_I 1, and this description may also be applied to other low resolution SEM images (e.g., the N-th low resolution SEM image LR_S_IN N).

As described herein, a low resolution SEM image may refer to an SEM image having resolution lower than/less than that of a super resolution SEM image.

The first low resolution SEM image LR_S_I 1 received by the cropping unit 110 may be, for example, an image after an etching process for forming fins is performed with respect to a FinFET semiconductor element. Alternatively or additionally, the first low resolution SEM image LR_S_I 1 received by the cropping unit 110 may be an image after a trench etching process for forming shallow trench insulators (STIs) is performed with respect to a dynamic random access memory (DRAM) semiconductor element. Alternatively or additionally, the first low resolution SEM image LR_S_I 1 received by the cropping unit 110 may be an image after an etching process for forming gate lines is performed with respect to a NAND semiconductor element. Alternatively or additionally, the first low resolution SEM image LR_S_I 1 received by the cropping unit 110 may be an image after an etching process for forming channel holes is performed with respect to a VNAND semiconductor element. The first low resolution SEM image LR_S_I 1 received by the cropping unit 110 is not limited to the above-described examples, and may be an image in a processing process for various semiconductor devices.

The cropping unit 110 may crop the first low resolution SEM image LR_S_I 1. For example, the cropping unit 110 may crop the first low resolution SEM image LR_S_I 1 to generate a plurality of cropped images (first cropped image C_I 1 to sixteenth cropped image C_I 16). For reference, the number of cropped images generated by cropping the first low resolution SEM image LR_S_I 1 by the cropping unit 110 is not limited to 16, and may be greater than 16 or less than 16.

Figure 4:
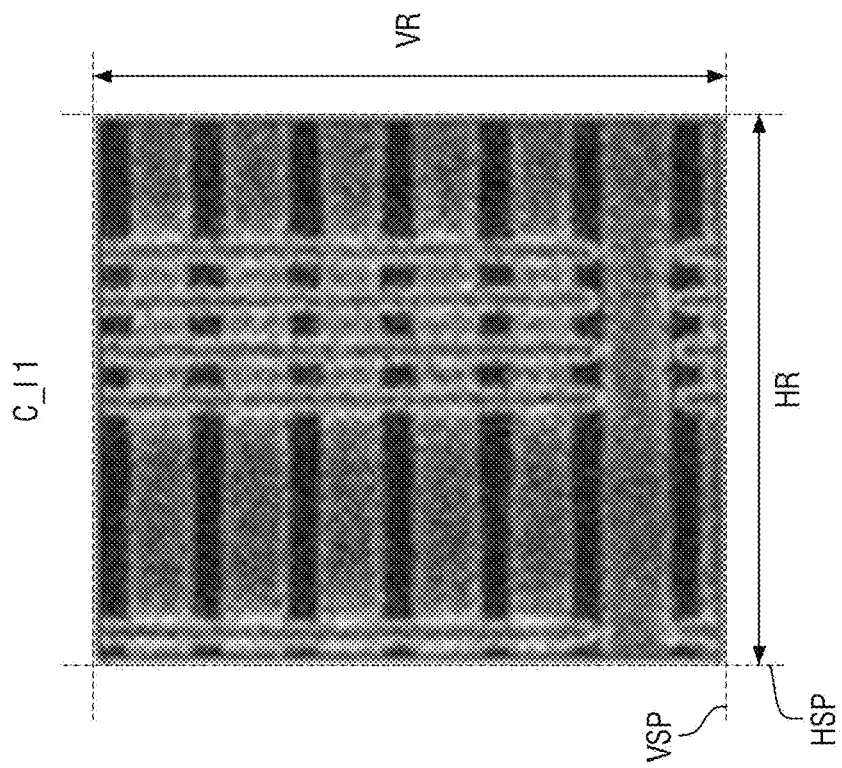
FIG. 4 is an illustrative view for describing a cropped image.

The first cropped image C_I 1 generated by cropping the first low resolution SEM image LR_S_I 1 by the cropping unit 110 may be generated, for example, as illustrated in FIG. 4.

FIG. 4 is an illustrative view for describing a cropped image.

Referring to FIGS. 2 to 4, the first cropped image C_I 1 generated by cropping the first low resolution SEM image LR_S_I 1 by the cropping unit 110 is illustrated. Hereinafter, a description for the first cropped image C_I 1 may also be applied to other cropped images (second cropped image C_I 2 to sixteenth cropped image C_I 16).

The cropping unit 110 may store a first position, which is position information on the first cropped image C_I 1, in the buffer 112. The buffer 112 may be implemented as a static random access memory (SRAM) buffer and/or a dynamic random access memory (DRAM) buffer; however, example embodiments are not limited thereto.

For example, the cropping unit 110 may store a first position including a horizontal starting point HSP, a vertical starting point VSP, a horizontal range HR, and a vertical range VR for cropping the first cropped image C_I 1, in the buffer 112. Although the horizontal starting point HSP and the vertical starting point VSP are illustrated as being in the bottom-left of the first cropped image C_I 1 in FIG. 4, example embodiments are not limited thereto, and the starting points may be at other positions in the first cropped image C_I 1.

The cropping unit 110 may crop the first low resolution SEM image LR_S_I 1 so that there are no portions overlapping each other between the plurality of cropped images (first cropped image C_I 1 to sixteenth cropped image C_I 16) generated by cropping the first low resolution SEM image LR_S_I 1.

For example, the plurality of cropped images (first cropped image C_I 1 to sixteenth cropped image C_I 16) may be cropped without areas overlapping each other within the first low resolution SEM image LR_S_I 1.

Alternatively, the cropping unit 110 may crop the first low resolution SEM image LR_S_I 1 so that there are portions overlapping each other between the plurality of cropped images (first cropped image C_I 1 to sixteenth cropped image C_I 16) generated by cropping the first low resolution SEM image LR_S_I 1.

A detailed description therefor will be described below with reference to FIGS. 5 and 6.

Figure 5:
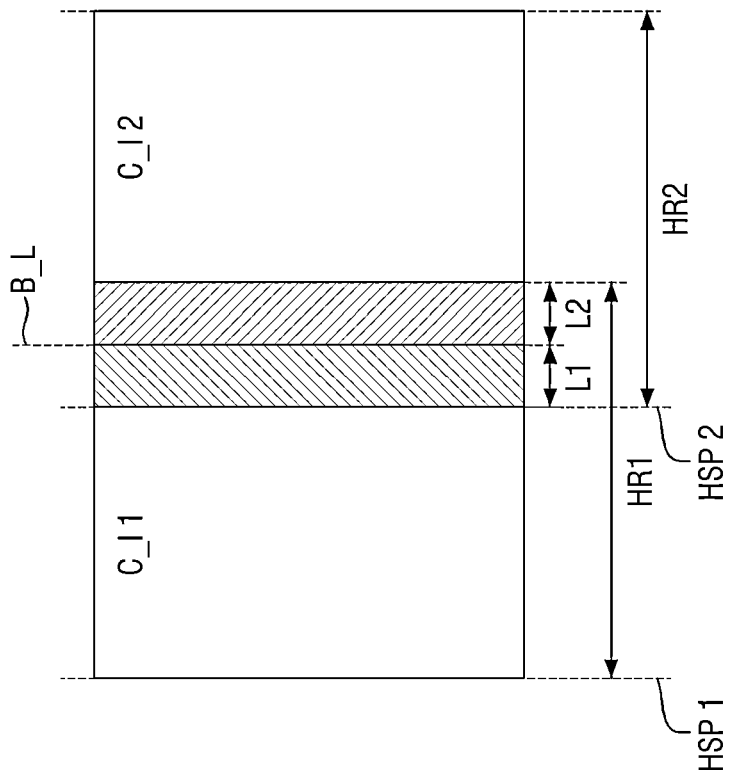
FIG. 5 is an illustrative view for describing a plurality of cropped images adjacent to each other.
Figure 6:
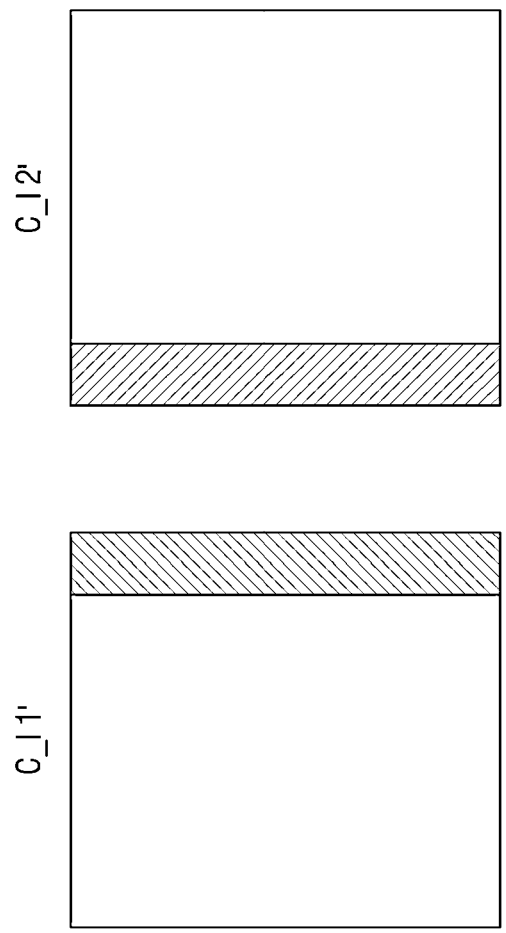
FIG. 6 is an illustrative view for describing cropped images generated through another cropping operation of the cropping unit.

FIG. 5 is an illustrative view for describing a plurality of cropped images adjacent to each other. FIG. 6 is an illustrative view for describing cropped images generated through another cropping operation of the cropping unit.

Referring to FIGS. 2, 3, 5, and 6, the first cropped image C_I 1 and the second cropped image C_I 2 may be in contact with each other on the basis of/along a boundary line B_L.

In this case, the cropping unit 110 may designate a first horizontal range HR1 from a first horizontal starting point HSP 1 where cropping starts, as a cropping area, and perform the cropping. In addition, the cropping unit 110 may designate a second horizontal range HR2 from a second horizontal starting point HSP 2 where cropping starts, as another cropping area, and perform the cropping.

For example, the cropping unit 110 may generate a first-first cropped image C_I 1' cropped so as to include an area permeating from the boundary line B_L into the second cropped image C_I 2 by a second length L2 (area patterned as diagonal lines from the upper left side to the lower right side) with respect to the first cropped image C_I 1.

In addition, the cropping unit 110 may generate a second-first cropped image C_I 2' cropped so as to include an area permeating from the boundary line B_L into the first cropped image C_I 1 by a first length L1 (area patterned as diagonal lines from the upper right side to the lower left side) with respect to the second cropped image C_I 2.

For reference, the first length L1 and the second length L2 may be the same as, or different from each other.

Referring to FIG. 2 again, the upscaling unit 120 may upscale the plurality of cropped images (first cropped image C_I 1 to sixteenth cropped image C_I 16) generated through the cropping unit 110 to generate a plurality of upscaled images.

An operation of the upscaling unit 120 will be described in detail with reference to FIGS. 7 and 8.

Hereinafter, it will be described by way of example to upscale the first cropped image C_I 1 to generate a first upscaled image.

Figure 7:
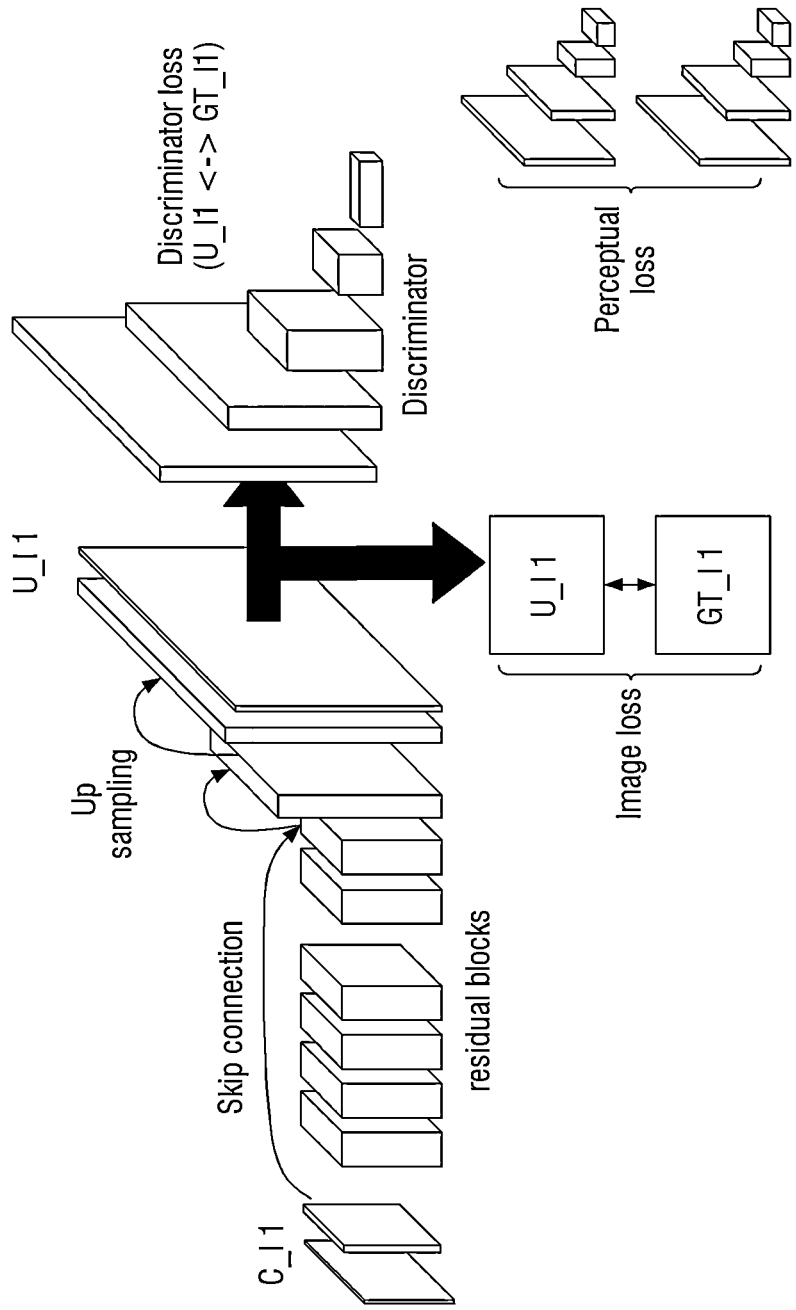
FIG. 7 is an illustrative view for describing an operation of an upscaling unit.

FIG. 7 is an illustrative view for describing an operation of an upscaling unit.

Referring to FIGS. 2 and 7, the upscaling unit 120 may first perform residual learning on the first cropped image C_I 1. In more detail, the upscaling unit 120 may generate a plurality of residual blocks for stability of learning with respect to the first cropped image C_I 1.

For example, the upscaling unit 120 may generate 16 residual blocks.

Thereafter, the upscaling unit 120 connects the front and the rear of the 16 residual blocks to each other using a skip connection for the 16 residual blocks to optimize filter parameters.

Thereafter, the upscaling unit 120 may generate a first upscaled image U_I 1 through a deconvolution and/or upsampling operation. For example, an upsampling operation for an upscaling multiple of 2 may be performed. Alternatively, for example, an upsampling operation for an upscaling multiple of 4 may be performed.

In this case, the upscaling unit 120 may generate the first upscaled image U_I 1 using a mean square error (MSE) loss function and/or a mean absolute error (MAE) loss function between the first upscaled image U_I 1 and a first ground truth image GT_I 1, generated through a deep learning-based network. For example, the upscaling unit 120 may generate the first upscaled image U_I 1 using an image loss. The first ground truth image GT_I 1 may be a high resolution image obtained from an SEM, corresponding to the first cropped image C_I 1.

Alternatively or additionally, the upscaling unit 120 may generate the first upscaled image U_I 1 using perceptual loss between the first upscaled image U_I 1 and a first ground truth image GT_I 1, generated using a convolutional neural network (CNN) such as VGGNet and/or Resnet, which are various deep learning-based image discriminator networks. The first ground truth image GT_I 1 may be a high resolution image obtained from an SEM, corresponding to the first cropped image C_I 1.

A discriminator network may continuously compare the first upscaled image U_I 1 and the first ground truth image GT_I 1 with each other to increase resolution of the first upscaled image U_I 1. The first ground truth image GT_I 1 may be a high resolution image obtained from an SEM, corresponding to the first cropped image C_I 1.

Figure 8:
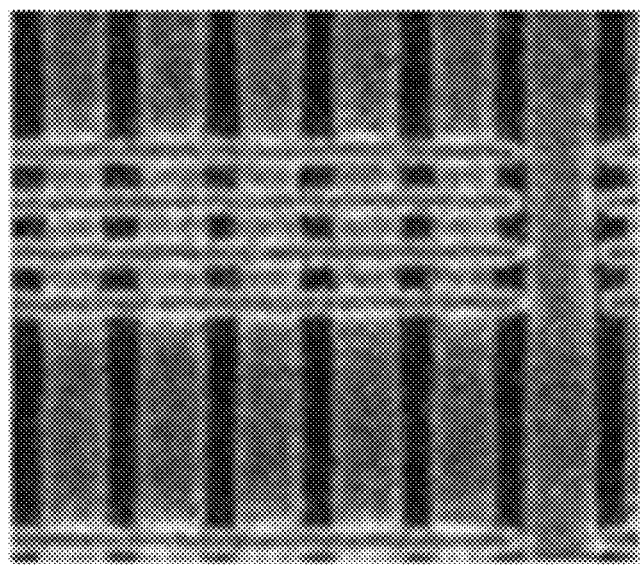
FIG. 8 is an illustrative view for describing an upscaled image generated through an upscaling operation of the upscaling unit.

FIG. 8 is an illustrative view for describing an upscaled image generated through an upscaling operation of the upscaling unit.

Referring to FIGS. 2, 4, and 8, a first upscaled image U_I 1 may be generated from the first cropped image C_I 1 through the operation of the upscaling unit 120 described above.

Referring to FIG. 2 again, the noise canceling unit 130 may cancel noise from the first upscaled image U_I 1 to generate a first noise canceled image.

An operation of the noise canceling unit 130 will be described with reference to FIG. 9.

Figure 9:
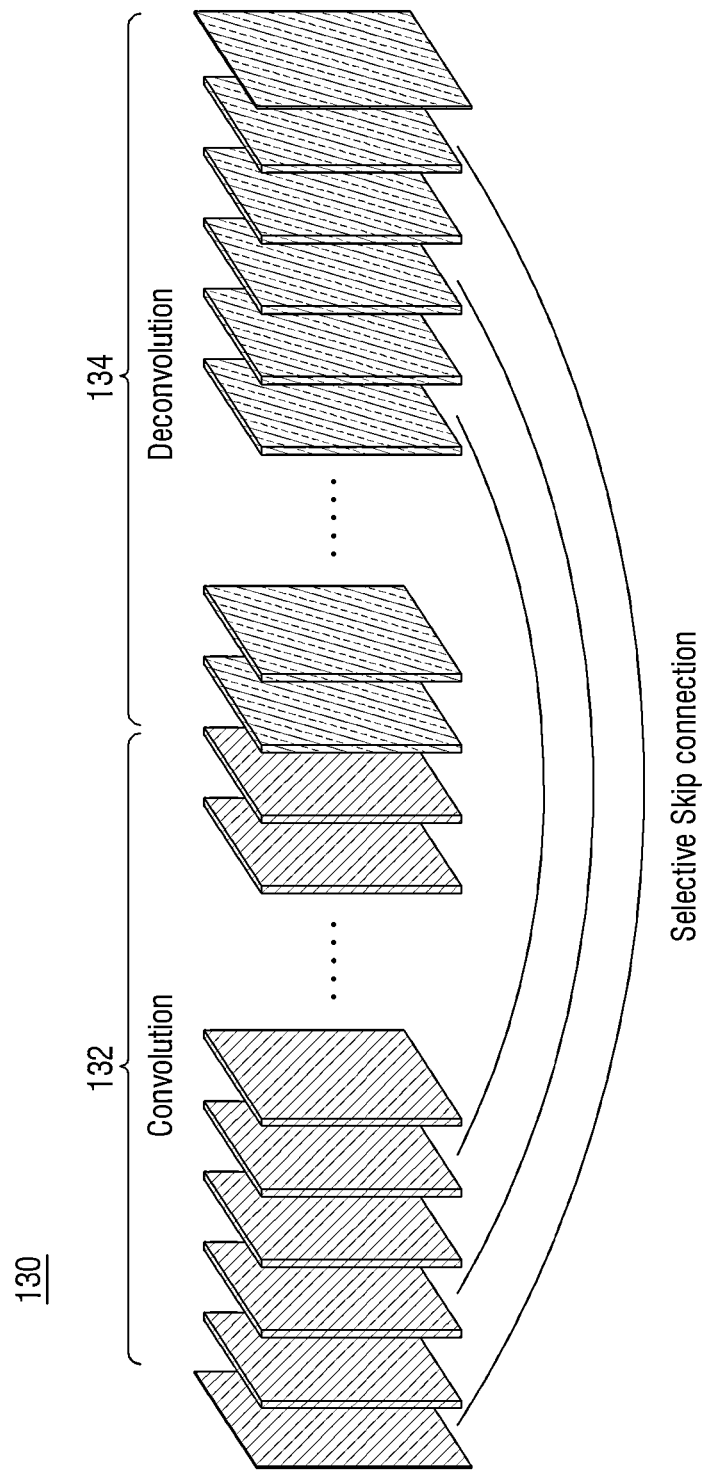
FIG. 9 is an illustrative view for describing an operation of a noise canceling unit.

FIG. 9 is an illustrative view for describing an operation of a noise canceling unit.

Referring to FIG. 9, the noise canceling unit 130 includes an encoder 132 performing convolution on the first upscaled image U_I 1 and a decoder 134 performing deconvolution on the first upscaled image U_I 1 on which the convolution is performed.

When a neural network model is learned, the deeper the layer of the neural network model, the better the learning result, but if the layer becomes too deep and/or the number of nodes is excessively increased, information loss may occur and/or a problem that weights are updated in an erroneous direction may occur.

Accordingly, in order to use information of the previous layer, a selective skip connection that connects the information of the previous layer may be applied.

For example, the noise canceling unit 130 may suppress loss of structural information for the first upscaled image U_I 1 received as an input of the noise canceling unit 130, and at the same time, cancel the noise from the first upscaled image U_I 1, through the selective skip connection between the encoder 132 and the decoder 134.

Figure 10:
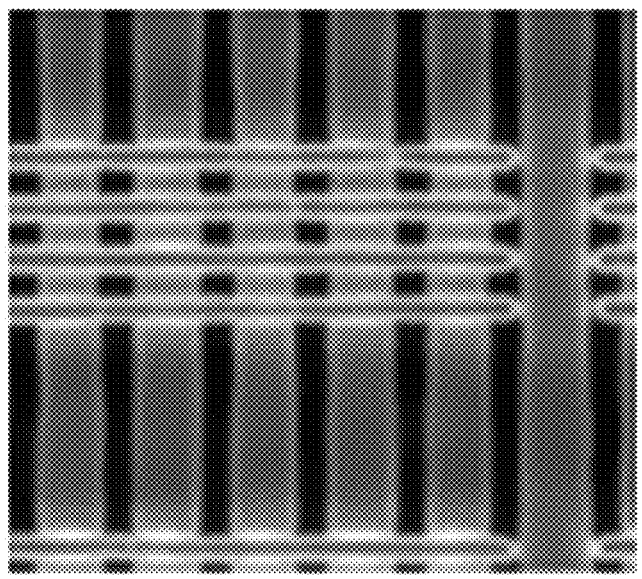
FIG. 10 is an illustrative view for describing a noise canceled image generated through a noise canceling operation of the noise canceling unit.

FIG. 10 is an illustrative view for describing a noise canceled image generated through a noise canceling operation of the noise canceling unit.

Referring to FIGS. 2, 9, and 10, a first noise canceled image N_C_I 1 in which the noise is canceled from the first upscaled image U_I 1 may be generated through the noise canceling unit 130.

Referring to FIG. 2 again, the merging unit 140 may merge a plurality of noise canceled images (e.g., a plurality of noise canceled image including the first noise canceled image N_C_I 1) generated through the first low resolution SEM image LR_S_I 1 with each other.

In this case, the merging unit 140 may merge the plurality of noise canceled images (e.g., the plurality of noise canceled image including the first noise canceled image N_C_I 1) with each other based on position information of each of the cropped images stored in the buffer 112.

As a result, one first super resolution SEM image may be generated.

Figure 11:
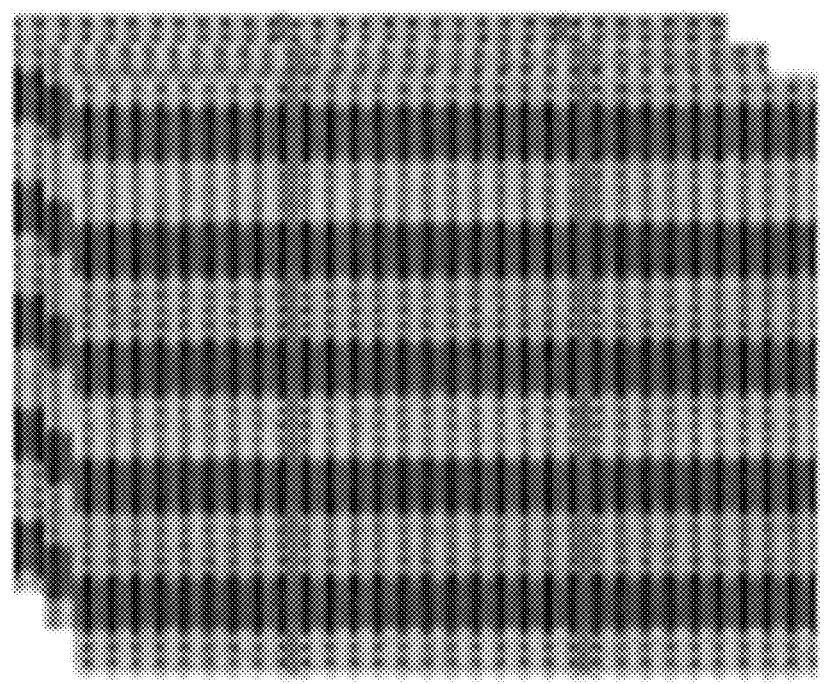
FIG. 11 is an illustrative view for describing a super resolution SEM image generated through a merging unit.

FIG. 11 is an illustrative view for describing a super resolution SEM image generated through a merging unit.

Referring to FIGS. 2 and 11 again, the merging unit 140 may merge the plurality of noise canceled images (e.g., the plurality of noise canceled image including the first noise canceled image N_C_I 1) generated through the first low resolution SEM image LR_S_I 1 with each other to generate a first super resolution SEM image SR_S_I.

In this case, when the cropping unit 110 of the super resolution SEM image implementing device 100 according to some example embodiments performs the cropping in such a way that the overlapping area is included as in the first-first cropped image C_I 1' and the second-first cropped image C_I 2', the merging unit 140 may perform merging by removing the overlapping area with respect to at least one cropped image.

Figure 12:
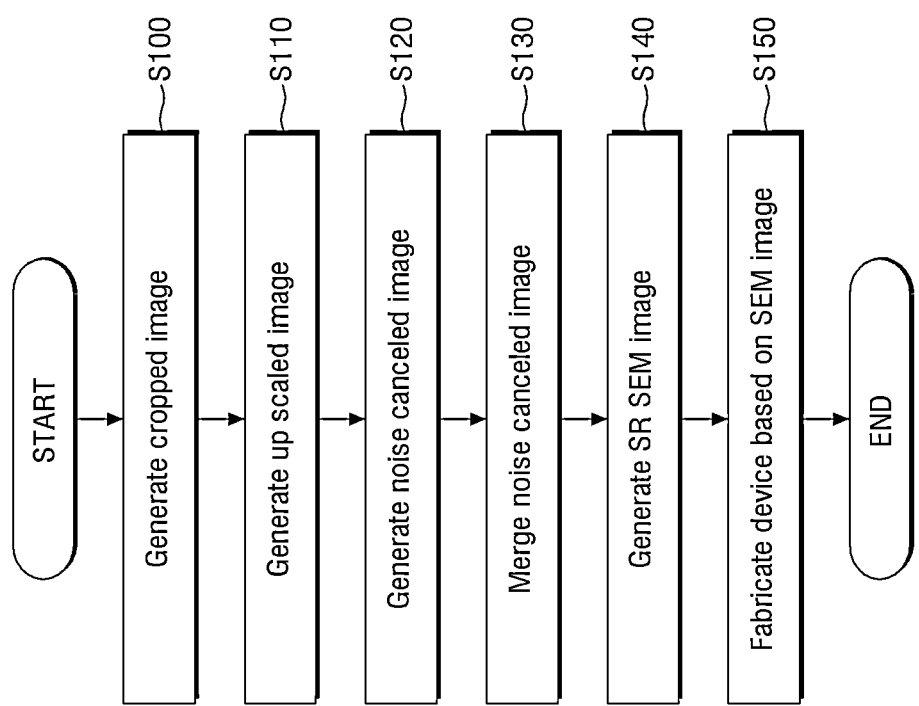
FIG. 12 is an illustrative flowchart for describing a super resolution SEM image implementing method according to some example embodiments.

FIG. 12 is an illustrative flowchart for describing a super resolution SEM image implementing method according to some example embodiments.

Referring to FIGS. 2 and 12, a plurality of cropped images are generated by cropping a low resolution scanning electron microscope (SEM) image through the cropping unit 110 (S100).

Then, a plurality of upscaled images are generated by performing upscaling on each of the plurality of cropped images through the upscaling unit 120 (S110).

Then, a plurality of noise canceled images are generated by canceling noise from each of the plurality of upscaled images through the noise canceling unit 130 (S120).

Then, a plurality of noise canceled images are merged with each other (S130), and one super resolution SEM image is generated (S140).

Optionally, a semiconductor device may be fabricated based on the super resolution SEM image (S150).

Figure 13:
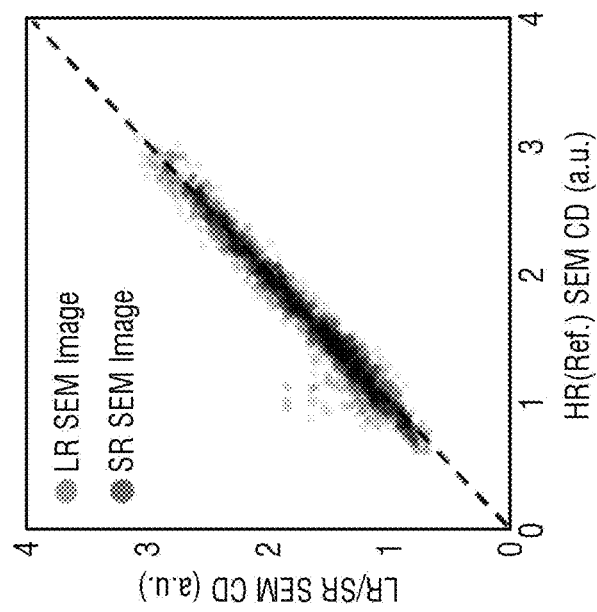
FIG. 13 is an illustrative graph illustrating a critical dimension (CD) distribution of the super resolution SEM image generated through the super resolution SEM image implementing method according to some example embodiments.

FIG. 13 is an illustrative graph illustrating a critical dimension (CD) distribution of the super resolution SEM image generated through the super resolution SEM image implementing method according to some example embodiments.

Referring to FIG. 13, a critical dimension (CD) extracted from the super resolution (SR) SEM images generated from the low resolution SEM images through the super resolution SEM image implementing device 100 according to some example embodiments is shown on a vertical axis.

In addition, a CD extracted from high resolution SEM images obtained from an SEM device is shown on a horizontal axis.

It can be seen through FIG. 13 that the super resolution (SR) SEM images generated from the low resolution SEM images through the super resolution SEM image implementing device 100 according to some example embodiments are very close to the high resolution SEM images obtained from the SEM device.

Figure 14:
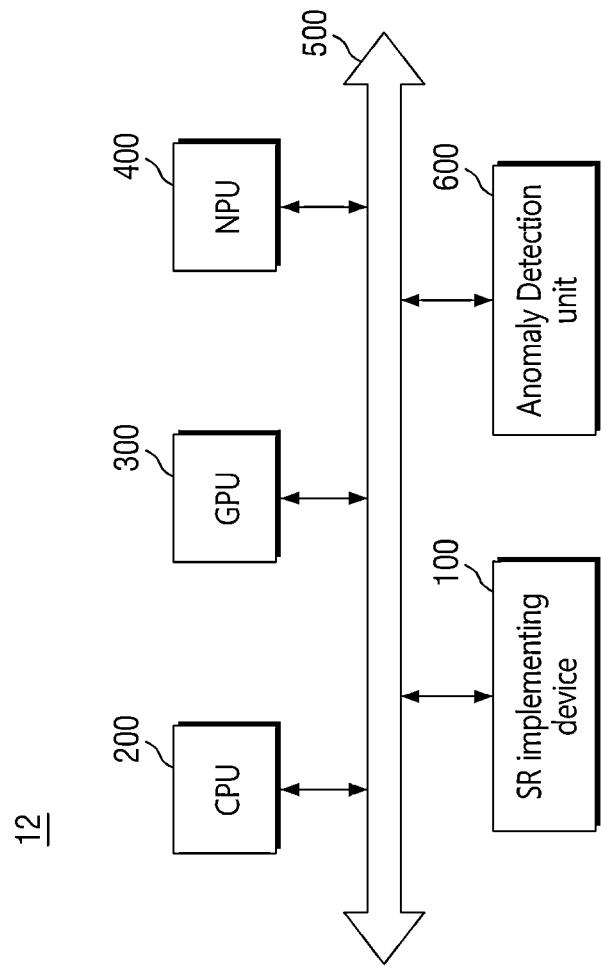
FIG. 14 is an illustrative block diagram illustrating another super resolution SEM image implementing system according to some example embodiments.

FIG. 14 is an illustrative block diagram illustrating another super resolution SEM image implementing system according to some example embodiments.

Referring to FIG. 14, another super resolution SEM image implementing system 12 according to some example embodiments is different from the super resolution SEM image implementing system 10 according to some example embodiments illustrated in FIG. 1 in that it further includes an anomaly detection unit 600.

Figure 15:
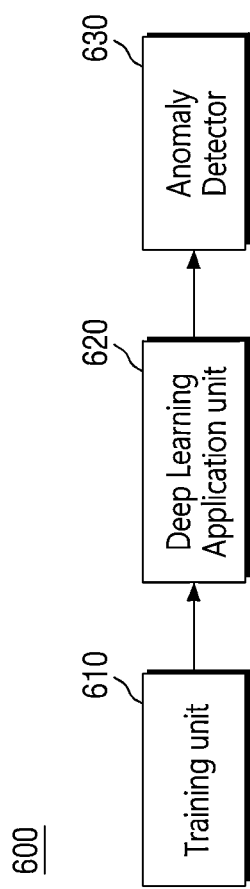
FIG. 15 is an illustrative block diagram for describing an anomaly detection unit according to some example embodiments.

FIG. 15 is an illustrative block diagram for describing an anomaly detection unit according to some example embodiments.

Referring to FIG. 15, the anomaly detection unit 600 includes a training unit 610, a deep learning application unit 620, and an anomaly detector 630.

The training unit 610 will be described with reference to FIG. 16.

Figure 16:
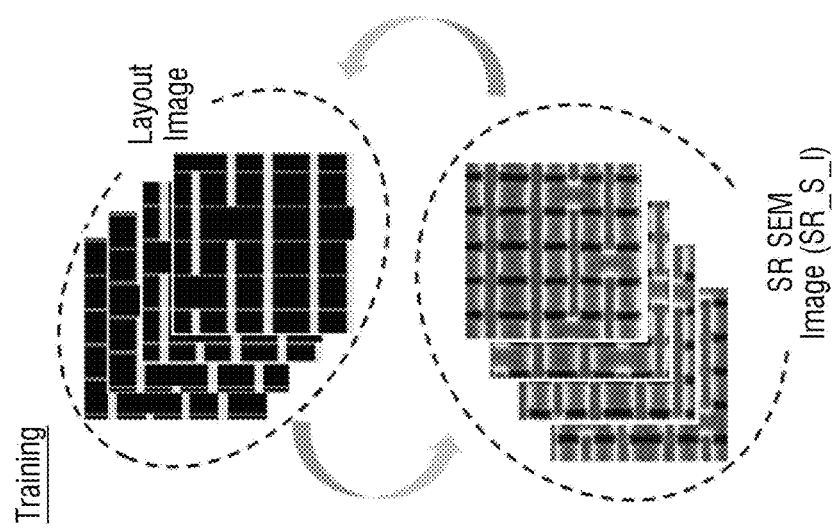
FIG. 16 is an illustrative view for describing an operation of a training unit of the anomaly detection unit.

FIG. 16 is an illustrative view for describing an operation of a training unit of the anomaly detection unit.

Referring to FIGS. 15 and 16, the training unit 610 performs image translation learning training through comparison with a layout image based on the super resolution SEM image SR_S_I received through the super resolution SEM image implementing device 100.

Referring to FIG. 15 again, SEM image translation is performed by the deep learning application unit 620 through a deep learning model on which learning training is performed through the layout image from the training unit 610.

An operation of the deep learning application unit 620 will be described with reference to FIG. 17.

Figure 17:
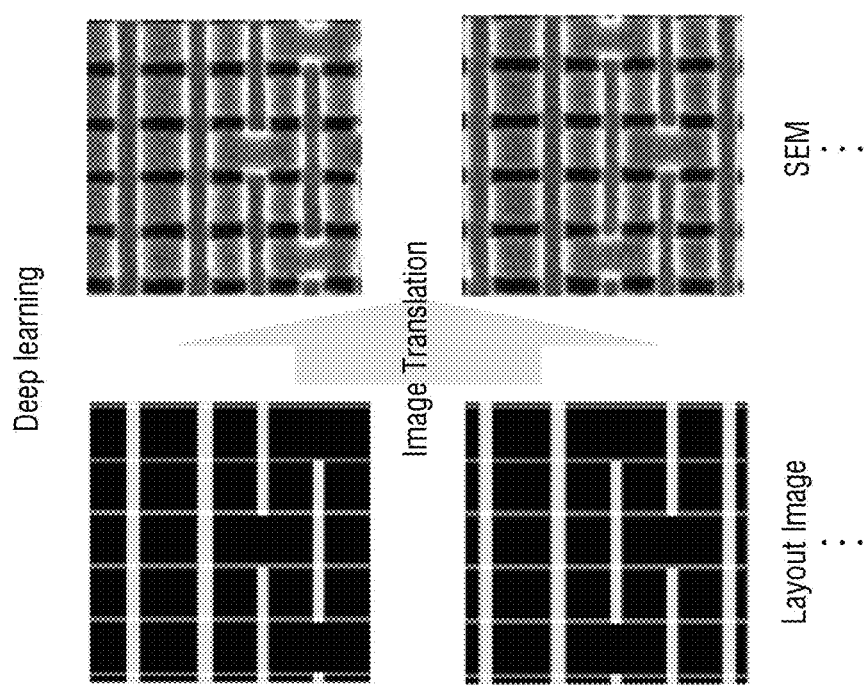
FIG. 17 is an illustrative view for describing an operation of the deep learning application unit of the anomaly detection unit.

FIG. 17 is an illustrative view for describing an operation of the deep learning application unit of the anomaly detection unit.

Referring to FIGS. 15 and 17, the deep learning application unit 620 performs SEM image translation based on an image translation deep learning model on which learning training is performed from the training unit 610 using machine learning such as at least one of an artificial neural network (ANN) or using deep learning such as a deep neural network (DNN), a convolutional neural network (CNN), or a generative adversarial network.

Referring to FIG. 15 again, the anomaly detector 630 detects abnormal images through an SEM image generated by the deep learning application unit 620. An operation of the anomaly detector 630 will be described with reference to FIG. 18.

Figure 18:
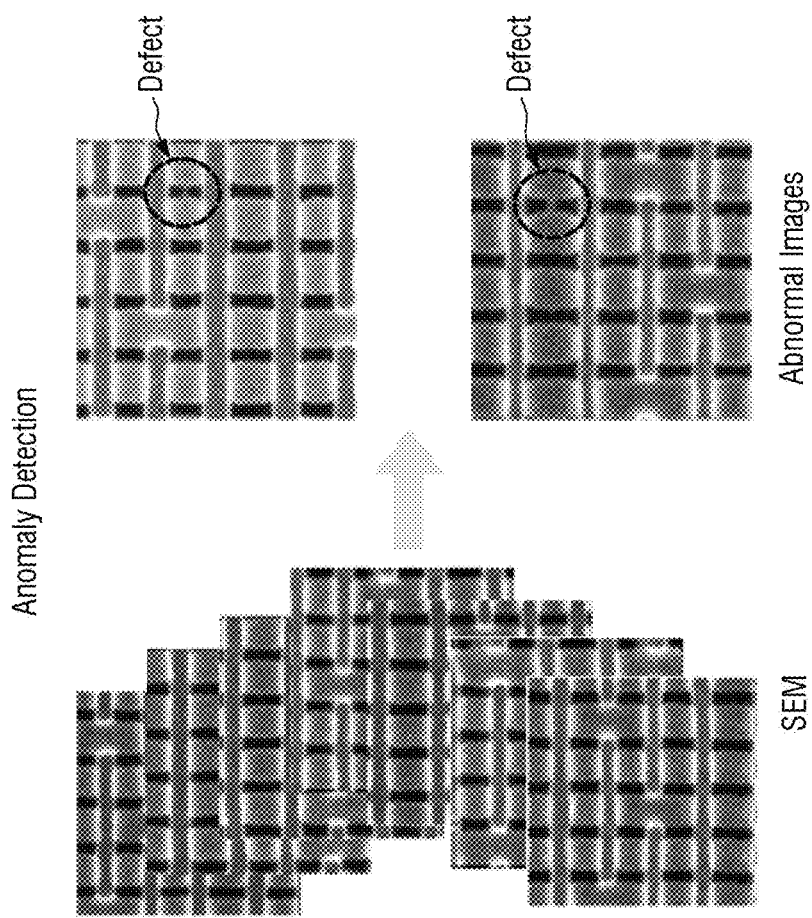
FIG. 18 is an illustrative block diagram for describing an operation of the anomaly detector of the anomaly detection unit.

FIG. 18 is an illustrative block diagram for describing an operation of the anomaly detector of the anomaly detection unit.

Referring to FIGS. 15 and 18, the anomaly detector 630 detects abnormal images through an SEM image generated by the deep learning application unit 620.

For example, the anomaly detector 630 may detect abnormal images in which defects are generated.

FIG. 19 is an illustrative flowchart for describing an operation of the anomaly detection unit according to some example embodiments.

Referring to FIGS. 15 and 19, in the anomaly detection unit 600 according to some example embodiments, the training unit 610 performs training through a layout image and translation learning based on the super resolution SEM image SR_S_I received through the super resolution SEM image implementing device 100 (S200).

Then, the deep learning application unit 620 performs SEM image translation through a layout image on which learning training is performed from the training unit 610 and a model on which learning training is performed based on an SEM image (S210).

Then, the anomaly detector 630 detects abnormal images through an SEM image generated by the deep learning application unit 620 (S220).

According to some example embodiments, by generating images with a low-resolution CD-SEM where the images are cropped and upscaled, a turn-around time (TAT) of imaging may be low. Furthermore by creating a super-resolution based on the cropped and upscaled images, a quality of the images may be improved, and a quality of semiconductor devices that are fabricated may be improved.

Any of the elements and/or functional blocks disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

Although various example embodiments have been described above with reference to the accompanying drawings, it will be understood by those of ordinary skill in the art that various embodiments are not limited thereto and may be implemented in many different forms without departing from the technical idea or essential features thereof. Therefore, it should be understood that example embodiments set forth herein are merely examples in all respects and not restrictive.

What is claimed is:

1. A super resolution scanning electron microscope (SEM) image implementing device comprising:
    a processor configured to execute machine-readable instructions to cause the device to crop a low resolution SEM image to generate a first cropped image and a second cropped image, the low resolution SEM image including an image of at least one of fins of a semiconductor device, shallow trench isolations of the semiconductor device, or gate lines of the semiconductor device,
    to upscale the first cropped image and the second cropped image to generate a first upscaled image and a second upscaled image using a ground truth image having high-resolution and corresponding to the first and second cropped image, respectively, and
    to cancel noise from the first upscaled image and the second upscaled image to generate a first noise canceled image and a second noise canceled image, wherein
    the noise canceling includes canceling noise based on a deep learning network trained on a layout of the semiconductor device, the layout corresponding to a field of view of the SEM image.

2. The super resolution SEM image implementing device of claim 1, further comprising:
    a buffer configured to store a first position of the cropping of the first cropped image and a second position of the cropping of the second cropped image.

3. The super resolution SEM image implementing device of claim 1, wherein the processor is configured to cause the device to,
    based on a boundary line corresponding to the first cropped image and the second cropped image contacting each other,
    generate a first-first cropped image further including a first area permeating from the boundary line into the second cropped image by a first length with respect to the first cropped image, and
    generate a second-first cropped image further including a second area permeating from the boundary line into the first cropped image by a second length with respect to the second cropped image.

4. The super resolution SEM image implementing device of claim 3, wherein the processor is configured to cause the device to upscale the first-first cropped image and the second-first cropped image to generate a first-first upscaled image and a second-first upscaled image.

5. The super resolution SEM image implementing device of claim 4, wherein the processor is configured to cause the device to cancel noise from the first-first upscaled image and the second-first upscaled image to generate a first-first noise canceled image and a second-first noise canceled image.

6. The super resolution SEM image implementing device of claim 1, wherein the processor is configured to cause the device to
    perform convolution on the first cropped image and the second cropped image, perform deconvolution on the first cropped image on which the convolution is performed and the second cropped image on which the convolution is performed, and generate the first noise canceled image and the second noise canceled image by applying a selective skip connection to the first cropped image and the second cropped image to cancel the noise.

7. The super resolution SEM image implementing device of claim 1, wherein the processor is further configured to cause the device to merge the first noise canceled image and the second noise canceled image with each other to generate a super resolution SEM image.

8. A super resolution SEM image implementing method comprising:

generating a first cropped image and a second cropped image by cropping a low resolution SEM image by a processor, the low resolution SEM image including an image of at least one of fins of a semiconductor device, shallow trench isolations of the semiconductor device, or gate lines of the semiconductor device;

generating a first upscaled image and a second upscaled image by upscaling the first cropped image and the second cropped image using a ground truth image having high-resolution and corresponding to the first and second cropped image, respectively; and generating a first noise canceled image and a second noise canceled image by canceling noise from the first upscaled image and the second upscaled image, wherein the noise canceling includes canceling noise based on a deep learning network trained on a layout of the semiconductor device, the layout corresponding to a field of view of the SEM image.

9. The super resolution SEM image implementing method of claim 8, further comprising:

storing, in a buffer, a first position of the cropping of the first cropped image and a second position of the cropping of the second cropped image.

10. The super resolution SEM image implementing method of claim 8, further comprising:

generating a super resolution SEM image by merging the first noise canceled image and the second noise canceled image with each other.

11. The super resolution SEM image implementing method of claim 8, wherein the generating of the first noise canceled image and the second noise canceled image includes:

generating the first noise canceled image and the second noise canceled image by performing a selective skip connection on the first cropped image and the second cropped image to cancel the noise, by performing convolution on the first cropped image and the second cropped image, and by performing deconvolution on the first cropped image on which the convolution is performed and the second cropped image on which the convolution is performed.

12. The super resolution SEM image implementing method of claim 8, further comprising:

based on a boundary line corresponding to the first cropped image and the second cropped image contacting each other, generating a first-first cropped image further including a first area permeating from the boundary line into the second cropped image by a first length with respect to the first cropped image, and generating a second-first cropped image further including a second area permeating from the boundary line into the first cropped image by a second length with respect to the second cropped image.

13. The super resolution SEM image implementing method of claim 12, further comprising:

generating a first-first upscaled image and a second-first upscaled image by upscaling the first-first cropped image and the second-first cropped image.

14. A super resolution SEM image implementing system comprising:

a central processing unit;

a bus connected to the central processing unit; and a super resolution SEM image implementing device communicating with the central processing unit via the bus, wherein the super resolution SEM image implementing device is configured to crop a low resolution SEM image to generate a first cropped image and a second cropped image, the low resolution SEM image including an image of at least one of fins of a semiconductor device, shallow trench isolations of the semiconductor device, or gate lines of the semiconductor device, to upscale the first cropped image and the second cropped image to generate a first upscaled image and a second upscaled image using a ground truth image having high-resolution and corresponding to the first and second cropped image, respectively, and to cancel noise from the first upscaled image and the second upscaled image to generate a first noise canceled image and a second noise canceled image, wherein the noise canceling includes canceling noise based on a deep learning network trained on a layout of the semiconductor device, the layout corresponding to a field of view of the SEM image.

15. The super resolution SEM image implementing system of claim 14, wherein the super resolution SEM image implementing device further includes:

a buffer configured to store a first position of the cropping of the first cropped image and a second position of the cropping of the second cropped image.

16. The super resolution SEM image implementing system of claim 14, wherein super resolution SEM image implementing device is configured to, based on a boundary line corresponding to the first cropped image and the second cropped image contacting each other, generate a first-first cropped image further including a first area permeating from the boundary line into the second cropped image by a first length with respect to the first cropped image, and generate a second-first cropped image further including a second area permeating from the boundary line into the first cropped image by a second length with respect to the second cropped image.

17. The super resolution SEM image implementing system of claim 16, wherein super resolution SEM image implementing device is configured to upscale the first-first cropped image and the second-first cropped image to generate a first-first upscaled image and a second-first upscaled image.

18. The super resolution SEM image implementing system of claim 17, wherein the super resolution SEM image implementing device is configured to cancel noise from the first-first upscaled image and the second-first upscaled image to generate a first-first noise canceled image and a second-first noise canceled image.

19. The super resolution SEM image implementing system of claim 14, wherein the super resolution SEM image implementing device is configured to,
- perform convolution on the first cropped image and the second cropped image; and
- perform deconvolution on the first cropped image on which the convolution is performed and the second cropped image on which the convolution is performed, and
- generate the first noise canceled image and the second noise canceled image by performing a selective skip connection on the first cropped image and the second cropped image to cancel the noise.

20. The super resolution SEM image implementing system of claim 14, wherein the super resolution SEM image implementing device is configured to merge the first noise canceled image and the second noise canceled image with each other to generate a super resolution SEM image.

* * * * *